(12) United States Patent
Noh et al.

(10) Patent No.: US 10,868,608 B2
(45) Date of Patent: Dec. 15, 2020

(54) METHOD AND APPARATUS FOR BEAM ASSOCIATION BETWEEN DOWNLINK/UPLINK

(71) Applicant: Samsung Electronics Co., Ltd., Suwon-si (KR)

(72) Inventors: Jeehwan Noh, Suwon-si (KR); Taeyoung Kim, Seoul (KR); Hyunil Yoo, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 151 days.

(21) Appl. No.: 15/971,243

(22) Filed: May 4, 2018

(65) Prior Publication Data

US 2018/0323855 A1    Nov. 8, 2018

(30) Foreign Application Priority Data

May 4, 2017  (KR) .................. 10-2017-0056812
Jun. 15, 2017 (KR) .................. 10-2017-0075720

(51) Int. Cl.
| | |
|---|---|
| *H04B 7/06* | (2006.01) |
| *H04W 76/27* | (2018.01) |
| *H04W 72/04* | (2009.01) |
| *H04B 7/08* | (2006.01) |
| *H04B 7/0408* | (2017.01) |

(52) U.S. Cl.
CPC ......... *H04B 7/0695* (2013.01); *H04B 7/0408* (2013.01); *H04B 7/0617* (2013.01); *H04B 7/0626* (2013.01); *H04B 7/088* (2013.01); *H04W 72/042* (2013.01); *H04W 76/27* (2018.02); *H04W 72/046* (2013.01)

(58) Field of Classification Search
None
See application file for complete search history.

(56) References Cited

U.S. PATENT DOCUMENTS

| | | | |
|---|---|---|---|
| 9,642,165 B2 | 5/2017 | Jung et al. | |
| 10,425,138 B2* | 9/2019 | Islam | H04B 7/0417 |
| 2014/0029458 A1* | 1/2014 | Ye | H04W 24/10 370/252 |
| 2016/0285660 A1 | 9/2016 | Frenne et al. | |
| 2017/0302341 A1 | 10/2017 | Yu et al. | |
| 2017/0317866 A1* | 11/2017 | Stirling-Gallacher | H04B 7/0695 |

OTHER PUBLICATIONS

Ericsson; On robust beam management; 3GPP TSG-RAN WG1 #87ah-NR; R1-1700748; Jan. 16-20, 2017; Spokane, WA.
(Continued)

*Primary Examiner* — Alex Skripnikov
(74) *Attorney, Agent, or Firm* — Jefferson IP Law, LLP

(57) ABSTRACT

The disclosure relates to a communication scheme and system for the convergence of a 5G communication system for supporting a higher a data transfer rate after the 4G system with the IoT technology. The disclosure may be applied to intelligence services (e.g., a smart home, a smart building, a smart city, a smart car or connected car, healthcare, digital education, retail business, security and safety-related services) based on the 5G communication technology and IoT-related technology. The disclosure discloses a method and apparatus for a beam association between DL/UL.

12 Claims, 13 Drawing Sheets

(56) References Cited

OTHER PUBLICATIONS

Huawei et al.; UL beam management; 3GPP TSG RAN WG1 Meeting #88b; R1-1704231; Apr. 3-7, 2017; Spokane, WA.
Ericcson; Beam management details; 3GPP TSG-RAN WG1 #88bis; R1-1705891; Apr. 3-7, 2017; Spokane, WA.
International Search Report dated Aug. 16, 2018; International Appln. No. PCT/KR2018/005200.

* cited by examiner

METHOD AND APPARATUS FOR BEAM ASSOCIATION BETWEEN DOWNLINK/UPLINK

CROSS-REFERENCE TO RELATED APPLICATION(S)

This application is based on and claims priority under 35 U.S.C. § 119(a) of Korean patent application number 10-2017-0056812, filed on May 4, 2017, in the Korean Intellectual Property Office, and under 35 U.S.C. § 119(a) Korean patent application number 10-2017-0075720, filed on Jun. 15, 2017, in the Korean Intellectual Property Office, the disclosure of which is incorporated by reference herein in its entirety.

BACKGROUND

1. Field

The disclosure relates to a technology in which a beam obtained through beam management (BM) is applied to a reference signal (RS)/data transmission in a system using analog beamforming.

2. Description of the Related Art

To meet the demand for wireless data traffic having increased since deployment of 4G communication systems, efforts have been made to develop an improved 5G or pre-5G communication system. Therefore, the 5G or pre-5G communication system is also called a 'Beyond 4G Network' or a 'Post LTE System'. The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), full dimensional MIMO (FD-MIMO), array antenna, an analog beam forming, large scale antenna techniques are discussed in 5G communication systems. In addition, in 5G communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like. In the 5G system, Hybrid FSK and QAM Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the Internet of Things (IoT) where distributed entities, such as things, exchange and process information without human intervention. The internet of everything (IoE), which is a combination of the IoT technology and the Big Data processing technology through connection with a cloud server, has emerged. As technology elements, such as "sensing technology", "wired/wireless communication and network infrastructure", "service interface technology", and "Security technology" have been demanded for IoT implementation, a sensor network, a machine-to-machine (M2M) communication, machine type communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing information technology (IT) and various industrial applications.

In line with this, various attempts have been made to apply 5G communication systems to IoT networks. For example, technologies such as a sensor network, MTC, and M2M communication may be implemented by beamforming, MIMO, and array antennas. Application of a cloud radio access network (RAN) as the above-described Big Data processing technology may also be considered to be as an example of convergence between the 5G technology and the IoT technology.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below.

Accordingly, an aspect of the disclosure is to provide a method and apparatus for a beam association between downlink (DL)/uplink (UL).

Additional aspects will be set forth in part in the description which follows and, in part, will be apparent from the description, or may be learned by practice of the presented embodiments.

In accordance with an aspect of the disclosure, a method for a terminal to operate is provided. The method includes receiving first information indicating the type of resource related to UL transmission and second information indicating a resource of the type of resource from a base station, selecting a beam for the UL transmission based on the first information and the second information, and transmitting an UL signal based on the selected beam. Furthermore, an embodiment of the disclosure provides a terminal, including a transceiver configured to transmit and receive signals and a controller configured to control to receive first information indicating the type of resource related to UL transmission and second information indicating a resource of the type of resource from a base station, to select a beam for the UL transmission based on the first information and the second information, and to transmit an UL signal based on the selected beam.

In accordance with another aspect of the disclosure, a method for a base station to operate is provided. The method includes transmitting first information indicating the type of resource related to UL transmission and second information indicating a resource of the type of resource to a terminal, selecting a beam for UL reception based on the first information and the second information, and receiving an UL signal from the terminal based on the selected beam.

In accordance with another aspect of the disclosure a base station is provided. The base station includes a transceiver configured to transmit and receive signals and a controller configured to control to transmit first information indicating the type of resource related to uplink (UL) transmission and second information indicating a resource of the type of resource to a terminal, to select a beam for UL reception based on the first information and the second information, and to receive an UL signal from the terminal based on the selected beam.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

The same reference numerals are used to represent the same elements throughout the drawings.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

The merits and characteristics of the disclosure and a method of achieving the merits and characteristics will become more apparent from the embodiments described in detail in conjunction with the accompanying drawings. However, the disclosure is not limited to the disclosed embodiments, but may be implemented in various different ways. The embodiments are provided to only complete the disclosure and to allow those skilled in the art to fully understand the category of the disclosure. The disclosure is defined by the category of the claims.

Figure 1:
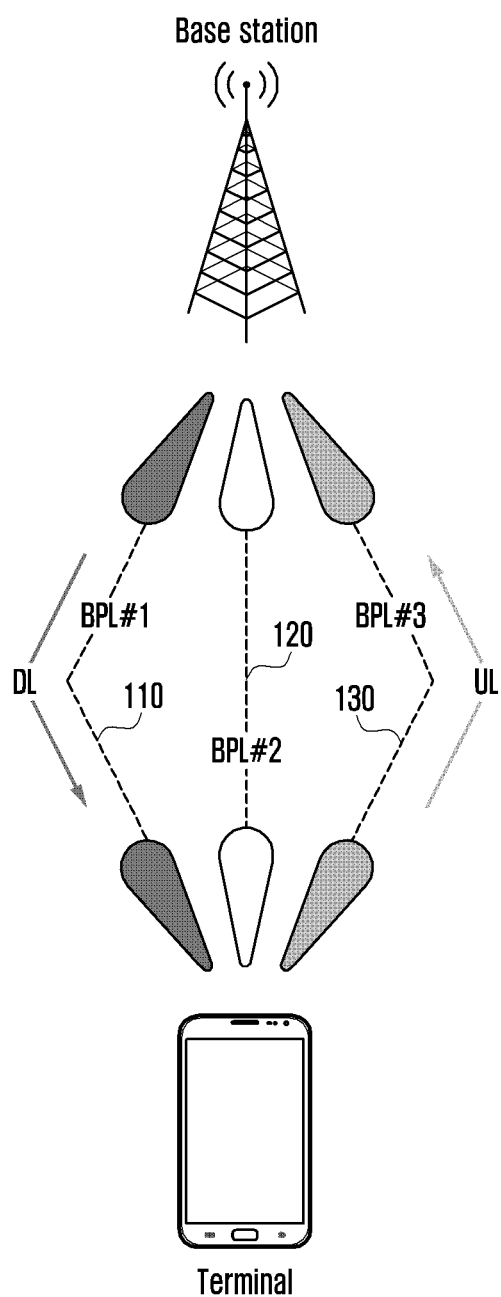
FIG. 1 is a diagram showing the application of independent beam pair links (BPL) to downlink (DL) transmission and uplink (UL) transmission according to an embodiment of the disclosure.

FIG. 1 is a diagram showing the application of independent beam pair links (BPL) to downlink (DL) transmission and uplink (UL) transmission according to an embodiment of the disclosure.

Referring to FIG. 1, assuming that a base station performs beam management (BM) in order to search for a beam to be used for UL transmission, the base station may take into consideration 1. a method of searching for a beam to be used for UL transmission by performing UL BM and 2. a method of using a beam obtained through DL BM for UL transmission. Assuming that the base station selects one of the two methods and performs the selected method, a terminal also needs to be aware of information on the selected method in order to configure a beam to be used for UL transmission. Accordingly, the base station needs to indicate whether it will perform UL transmission based on which BM (DL BM or UL BM) for the terminal. An embodiment of the disclosure proposes a method for a base station to indicate the type of BM to be used for UL transmission (or DL transmission) for a terminal. In this case, UL transmission may include some or all of sounding reference signal (SRS) transmission, physical uplink control channel (PUCCH) transmission, and physical uplink shared channel (PUSCH) transmission. For example, indication for enabling a terminal to determine a beam to be used for UL SRS transmission is also included in an embodiment of the disclosure. In the following specification, a portion described as being UL transmission involves the same intention as that of the aforementioned contents.

When a base station selects a DL BPL, a DL scheduling element in which a plurality of terminals has been taken into consideration needs to be taken into consideration. In such a situation, when DL BM is used for UL transmission, if a DL BPL used for DL transmission is used for UL transmission always identically, UL beam flexibility may be limited. The reason for this is that a BPL not related to DL scheduling and having the best link quality may be more appropriate for UL transmission. FIG. 1 shows a case where from among established BPLs 110, 120 and 130, the BPL 110 for DL transmission and the BPL 130 for UL transmission are independently applied. In order to secure UL beam flexibility, there is a need for indication regarding that which UL BPL will be used for UL transmission in order to independently apply an UL BPL and a DL BPL. An embodiment of the disclosure proposes such UL BPL indication methods.

Each node (base station or terminal) determines whether the BC of the corresponding node has been established. In this case, BC is defined to indicate whether the transmission beam and reception beam of the node are identically used. If BC has been established, the corresponding node may use the same transmission beam and reception beam. If BC has not been established, the corresponding node must use a different transmission beam and reception beam. In a system using an analog beam (e g mmWave transmission/reception system), a base station searches for a beam to be applied to a reference signal (RS) and data through BM. In an embodiment of the disclosure, BM may include up to a process of sweeping a beam in order to search for a transmission or reception beam and reporting the results of an obtained beam to a counterpart. BM includes two types of DL BM and UL BM, and whether BM will be performed is determined by a base station. In order to determine whether or not to perform DL BM or UL BM, a base station needs to take into consideration both whether the BC of the base station has been established and whether the BC of a terminal has been established. To this end, prior to BM execution, the terminal may report whether its BC has been established to the base station. A link formed by a transmission beam obtained in a process of performing BM and a reception beam corresponding to the transmission beam is called a BPL. That is, a link formed by the transmission beam of a transmission device and the reception beam of a reception device may be defined as a BPL. In accordance with an embodiment of the disclosure, a BPL may be indicated in various manners. In an embodiment of the disclosure, assuming that a base station and a terminal have established a plurality of BPLs through BM, the number of BPLs that belong to the established BPLs and that are applied (or activated) to actual transmission may be one or more. A BPL that belongs to subsequently established BPLs and that is applied (or activated) to DL transmission is called a DL BPL. A BPL that belongs to subsequently established BPLs and that is applied (or activated) to UL transmission is called an UL BPL.

A DL/UL beam association proposed by an embodiment of the disclosure basically enables the following operation:
An operation of enabling a DL BM-based BPL to be applied to UL transmission; and
An operation of enabling an UL BM-based BPL to be applied to DL transmission;
A method of expressing a DL/UL beam association operation proposed by an embodiment of the disclosure may be indicated in the following some types:
A beam association between a beam obtained through DL BM (or UL BM) and a beam to be applied to UL transmission (or DL transmission): a beam association between DL and UL; and
A beam association between an RS for DL BM (or UL BM) and an RS for UL transmission (or DL transmission): a beam association between a DL RS and an UL RS.

A reciprocal quasi-co-located (QCL) association between a DL RS and an UL RS: a beam association between a DL RS and an UL RS.

The aforementioned methods are different in their expression methods, but are the same in that they indicate an operation and indication regarding whether a DL BM (or UL BM)-based BPL (Tx beam and Rx beam) will be used for UL transmission (or DL transmission). In the subsequent description of this specification, the first expression method of the methods will be described, but other expression methods are the same in terms of an operation and are included in the scope of an embodiment of the disclosure.

Contents proposed by the disclosure basically include the following three embodiments.
First embodiment: a DL-based UL beam association: apply a BPL established through DL BM to UL transmission.
Second embodiment: a DL- and UL-based beam association: apply a BPL established through DL BM to UL transmission and apply a BPL established through UL BM to DL transmission.
Third embodiment: an UL-based DL beam association: apply a BPL established through UL BM to DL transmission.

First Embodiment: DL-Based UL Beam Association

The first embodiment is an embodiment in which a BPL established through DL BM is applied to UL transmission. A representative scenario of the first embodiment is an embodiment in which a DL channel state information-reference signal (CSI-RS) (used in DL BM) and/or a BPL established through a synchronization signal block (SSB) is used for an UL SRS/UL demodulation reference signal (DMRS)/PUCCH/PUSCH. For the first embodiment, a base station needs to perform the following two indications (i.e., indication regarding whether a DL-based UL beam association has been activated and UL BPL indication) for a terminal.

1. Indication Regarding Whether DL-Based UL Beam Association has Been Activated.

The indication regarding whether a DL-based UL beam association has been activated is indication that notifies a terminal whether a BPL established through DL BM is used for UL transmission. The terminal may configure a Tx beam used for UL transmission based on the indication. The corresponding indication may be expressed through a beam association between a DL RS and an UL RS or QCL between a DL RS and an UL RS in the standard rule, but operations indicating the beam association or the QCL are the same. Furthermore, the corresponding indication may be expressed as indication that provides notification of whether a beam to be used for UL transmission (e.g. UL SRS transmission) is based on a DL CSI-RS (or DL CRI), based on a DL SSB or based on an UL SRS (or UL SRI).

In a method of expressing a beam association between a DL RS and an UL RS, the DL RS indicates an RS used in DL BM, and the UL RS indicates an RS used for UL transmission. For example, if a CSI-RS is used as DL BM, the following associations between RSs are possible:
A DL CSI-RS and an UL SRS;
A DL CSI-RS and an UL DMRS;
A DL CSI-RS and an UL SRS/UL DMRS; and
A DL CSI-RS and an UL SRS/UL DMRS/UL phase tracking RS (PTRS).

An expression method indicating the following various associations between RSs may be possible, but all indication operations are the same in that a beam obtained through a DL CSI-RS is applied to some of or the entire (UL SRS/UL DMRS/PUCCH/PUSCH/UL PTRS) UL transmission. The indication regarding whether a DL-based UL beam association has been activated may include both a semi-static indication method and a dynamic indication method. The semi-static indication method may be performed through higher layer signaling (e.g., radio resource control (RRC) signaling). The dynamic indication method may include the following indication methods:

a) Downlink control information (DCI) indication;
b) Medium access control (MAC) control element (CE) indication;
c) DCI+MAC CE indication; and
d) Indication through DCI field classification.

The DCI+MAC CE indication method is a method of indicating an association with a given RS through DCI and indicating an association with a different RS through an MAC CE. In a related embodiment, the PUCCH relation between a DL CSI-RS and an UL DMRS may be indicated through an MAC CE, and the PUSCH relation between a DL CSI-RS and an UL DMRS may be indicated through DCI. An indication method through the DCI field classification is a classification method of designing cases where UL BM (or an UL RS) and DL BM (or a DL RS) are used by classifying a DCI field. In other words, this indication method is a method for a base station to trigger different DCI fields for UL transmission so that a terminal is aware of whether it has to refer to which BM or RS.

2. UL BPL Indication

UL BPL indication is indication for providing notification of an UL BPL to be used for UL transmission. The UL BPL indication may be said to be indication for providing notification of a terminal transmission beam to be actually used for the SRS/PUSCH or PUCCH of a terminal. In this case, if UL BPL indication has been transmitted for an SRS transmission beam configuration, different UL BPL indication or the same UL BPL indication may be transmitted for each of a plurality of SRS resources configured by a base station. Furthermore, if UL BPL indication has been transmitted for a PUCCH transmission beam configuration, multiple UL BPL indications may be transmitted for multi-beam PUCCH transmission.

In this case, if a DL-based UL beam association has been activated, some of BPLs established through DL BM is indicated. When a DL-based UL beam association is not activated, some of BPLs established through UL BM is indicated. Accordingly, the UL BPL indication may be indicated regardless of whether a DL→UL beam association has been activated. When an UL BPL is indicated, if the number of activated BPLs is plural, indication of a bitmap form may be used. The UL BPL indication may be indicated through higher layer signaling in the case of the semi-static method. Furthermore, the UL BPL indication may be dynamically performed using one of the DCI, MAC CE and DCI+MAC CE methods. Some methods for the UL BPL indication are proposed below.

2.1 UL BPL indication through RS resource indicator: a method of sharing a related BPL or the transmission beam of a terminal by providing notification of the resource of an RS used for DL BM or UL BM. Detailed embodiments of the UL BPL indication through an RS resource indicator are described below.

2.1.1 SRS resource indicator or SRS resource identity (ID) or SRS resource index (SRI), SSB resource indicator or SSB resource identity (ID) or SSB resource index (SSBRI) or CSI-RS resource indicator or CSI-RS resource identity (ID) or CSI-RS index (CRI) indication:

For example, if a CSI-RS is used for DL BM and an SRS is used for UL BM, if a DL-based UL beam association has been activated, a base station may share information about which BPL will be used with a terminal by notifying the terminal of a CRI. In this case, a method of providing notification of a given BPL by combining a CRI and a CSI-RS port in addition to using only the CRI may be used. In contrast, if a DL→UL beam association has not been activated, a base station may share information about which BPL will be used with a terminal by notifying the terminal of an SRS resource indicator (SRI). For another example, a base station may share information about which BPL will be used with a terminal by an SRI. In this case, a method of providing notification of a given BPL by combining an SRI and an SRS port in addition to using only the SRI may be used. For yet another example, a base station may share information about which BPL will be used with a terminal by transmitting an SSBRI. In this case, a method of providing notification of a given BPL by combining an SSBRI and an SSBRI port in addition to the use of only the SSBRI may be used. If different RSs are used for DL BM and UL BM, BPL information may be notified using an RS resource and an RS port using the same method.

2.1.1.1 1-step indication: a method of notifying a terminal of a given beam used for BM by indicating an SRI or CRI or SSBRI used for BM without any change at a time. As shown in Table 1, an RS resource indicator is transmitted for the transmission beam configuration of a terminal depending on whether a DL-based UL beam is associated. The corresponding indication may be transmitted through some or all of higher layer signaling, DCI and an MAC CE.

TABLE 1

| Beam association | 1$^{st}$ step |
| --- | --- |
| Without beam association | SRI |
| With beam association | CRI or SSBRI |

2.1.1.2 1-step indication: As shown in Table 2, an RS resource indicator is transmitted for the transmission beam configuration of a terminal depending on whether a DL-based UL beam is associated. A difference between Method 2.1.1.2 1-step indication and Method 2.1.1.1 is that a tag-based CRI is indicated if a DL-based UL beam has been associated. In this case, the tag-based CRI indicates a CRI that has been retagged with reference to CRIs reported by a terminal during a DL BM interval. If a tag-based CRI is used, there is an advantage in that the number of bits necessary for corresponding indication can be reduced. The corresponding indication may be transmitted through some or all of higher layer signaling, DCI and an MAC CE.

TABLE 2

| Beam association | 1$^{st}$ step |
| --- | --- |
| Without beam association | SRI |
| With beam association | Tag-based CRI or SSBRI |

2.1.1.3 2-step indication: a method of indicating corresponding information through a 2-step process when a base station notifies a terminal of SRI or CRI or SSBRI information. As shown in Table 3, in the first step, a plurality of RS resource indicators is transmitted to a terminal through higher layer signaling or an MAC CE depending on whether a DL-based UL beam is associated. The plurality of RS resource indicators transmitted through higher layer signaling or an MAC CE may be used for multi-beam PUCCH transmission. In the second step, RS resource indicators indicated in the first step are retagged as a reference, and a tag-based SRI or tag-based CRI is indicated through DCI.

TABLE 3

| Beam association | 1st step (RRC) 1st step (MAC CE) | 2nd step (MAC CE) 2nd step (DCI) |
|---|---|---|
| Without beam association | Multiple SRIs | Tag-based SRI |
| With beam association | Multiple CRIs or SSBRIs | Tag-based CRIs or SSBRIs |

2.1.1.4 Classification of DCI field of CRI and SRI: Methods 2.1.1.1 to 2.1.1.3 correspond to a method of performing UL BPL indication through one piece of DCI. In contrast, Method 2.1.1.4 is a method of classifying a DCI field depending on whether a DL-based UL beam is associated. If this method is used, the aforementioned indication regarding whether a DL-based UL beam association has been activated is not necessary. The reason for this is that a terminal can be aware of whether a DL→UL beam is associated because a base station triggers a given DCI field.

2.1.2 Only SRI indication: a method of always indicating a beam to be configured for UL transmission through an SRI regardless of whether a DL-based UL beam is associated. In this case, if a DL-based UL beam association has been activated, a mapping process between a CRI and the SRI is necessary. The following table shows indication necessary for Method 2.1.2.

TABLE 4

| Beam association | 1st step (MAC CE or higher layer signaling) | 2nd step (DCI) |
|---|---|---|
| Without beam association | X | SRI |
| With beam association | CRI to SRI mapping | |

In the CRI to SRI mapping of Table 4, some or all of CRIs used for DL BM may be mapped to an SRI. Indication for the CRI to SRI mapping may be performed through higher layer signaling or an MAC CE. The following table is an example in which only four of 16 CRIs used for DL BM have been mapped to an SRI.

TABLE 5

| SRI | CRI |
|---|---|
| 1 | 4 |
| 2 | 7 |
| 3 | 11 |
| 4 | 16 |

2.2 UL BPL indication through BPL index indication: a method of sharing a BPL to be used for UL transmission by providing notification of the index of a BPL through BM. If the case of FIG. 1 is taken as an example, the method is a method in which the number of BPLs formed between the base station and the terminal is three and the base station notifies the terminal of the index of a BPL that belongs to the BPL #1 to the BPL #3 and that is activated for UL BPL indication.

2.3 UL BPL indication through beam index indication: a method of sharing a BPL to be used for UL transmission by providing notification of a beam index used for beam sweep in a BM process. It is assumed that in a DL BM process, a base station performs beam sweep using 16 beams and a terminal formed BPLs by reporting the four preferred beams of the 16 beams to the base station. In this case, since the four BPLs are formed, there is a difference in that for UL BPL indication, an activated BPL of the 4 candidates is notified in Method 2.2, whereas an activated BPL of the 16 candidates is notified in Method 2.3.

Figure 2:
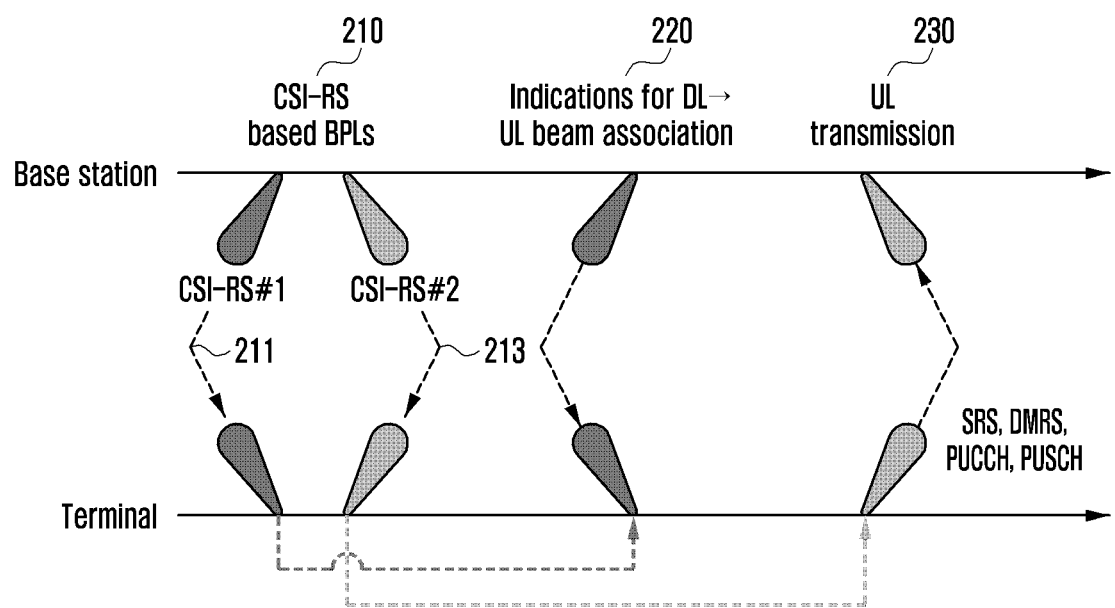
FIG. 2 is a diagram showing a process of applying a beam used for UL transmission through indication if a beam association has been activated according to a first embodiment of the disclosure.

FIG. 2 is a diagram showing a process of applying a beam used for UL transmission through the indication if a beam association has been activated according to a first embodiment of the disclosure.

Referring to FIG. 2, operation 210 shows an example in which two BPLs have been established through CSI-RS-based DL BM. In this case, it is assumed that a CSI-RS #1-based BPL 211 is used for DL transmission and a CSI-RS #2-based BPL 212 is used for UL transmission. Next, operation 220 is a process for a base station to perform indication necessary for a DL-based UL beam association with respect to a terminal. The corresponding indication includes the aforementioned indication regarding whether a DL-based UL beam association has been activated and the UL BPL indication, and is transmitted using a BPL selected for DL transmission. In FIG. 2, operation 230 is a process for the terminal to perform UL transmission by applying an UL BPL based on the received indication. In this case, the UL BPL may be applied to an UL SRS, an UL DMRS, a PUCCH or a PUSCH.

Figure 3A:
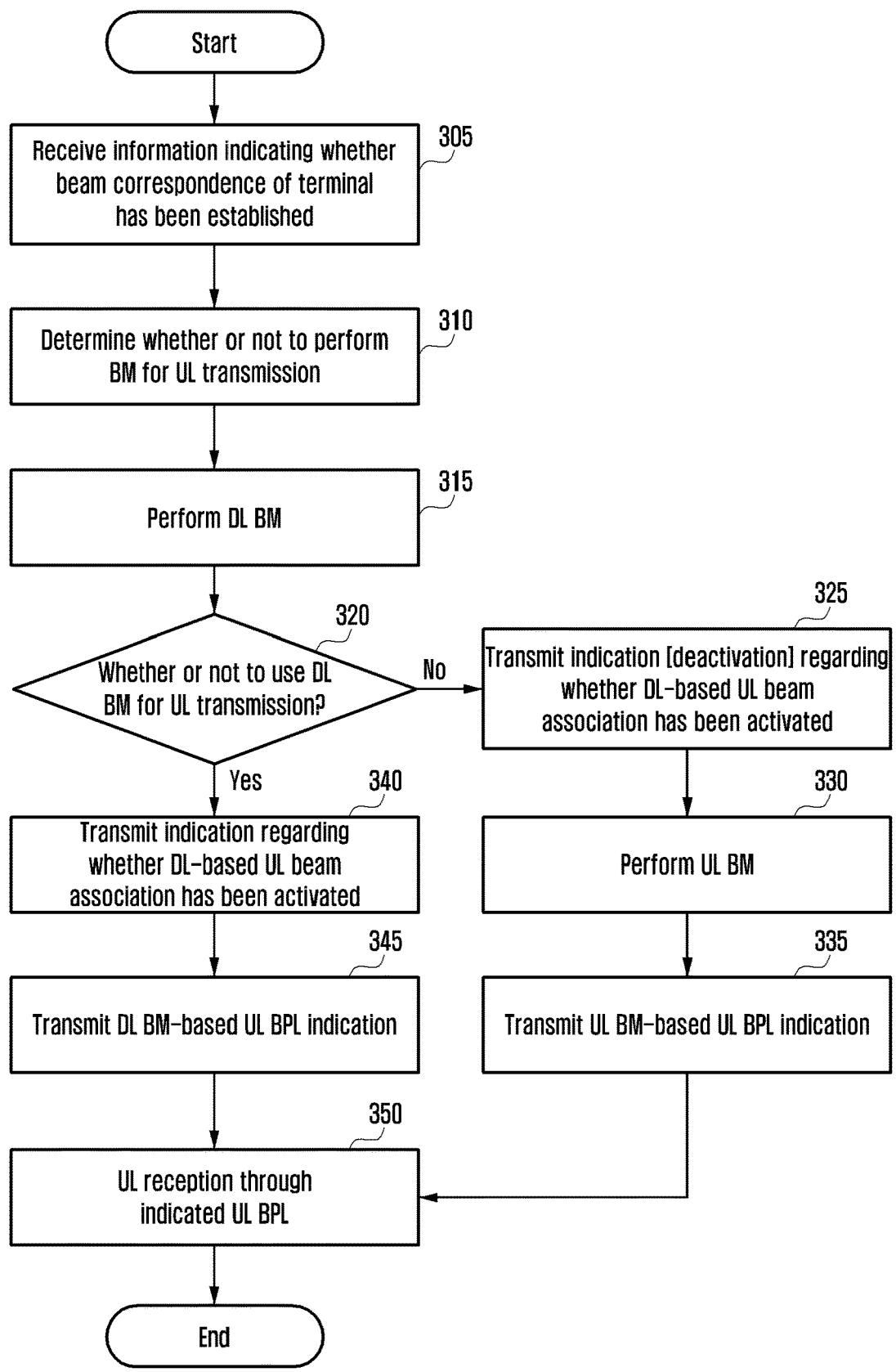
FIG. 3A is a diagram showing a procedure of a base station for a DL-based UL beam association according to a first embodiment of the disclosure.

FIG. 3A is a diagram showing a procedure of a base station for a DL-based UL beam association, according to a first embodiment of the disclosure.

Referring to FIG. 3A, at operation 305 the base station may receive information indicating whether the beam correspondence (BC) of a terminal has been established. At operation 310, the base station determines whether or not to perform BM for the UL transmission of the terminal. At operation 315, the base station performs BM on the terminal. The base station may perform DL BM. The base station may obtain at least one BPL as a result of the execution of the DL BM.

At operation 320, the base station may determine whether or not to use DL BM for the UL transmission of the terminal. If DL BM is not used, the base station may proceed to operation 325. If DL BM is used, the base station may proceed to operation 340.

At operation 325, the base station may transmit indication regarding whether a DL-based UL beam association has been activated to the terminal. The indication may indicate the deactivation of a DL-based UL beam association. For example, the base station may transmit information indicating whether a beam to be used for UL transmission is a DL CSI-RS, an SSB or an SRS. For a detailed operation, reference is made to the method of transmitting indication regarding whether a DL-based UL beam association has been activated in the first embodiment. Operation 325 may be omitted. If the DL-based UL beam association has been deactivated, the base station may perform UL BM along with the terminal at operation 330. At operation 335, the base station may transmit UL BM-based UL BPL indication to the terminal. For a detailed method of transmitting the UL BLP indication, reference is made to the operation of the first embodiment.

At operation 340, the base station may transmit indication regarding whether a DL-based UL beam association has been activated to the terminal. The indication may indicate the activation of a DL-based UL beam association. For example, the base station may transmit information indicating whether a DL beam to be used for UL transmission is a DL CSI-RS, an SSB or an SRS. For a detailed operation, reference is made to the method of transmitting indication regarding whether a DL-based UL beam association has been activated in the first embodiment. If the DL-based UL beam association has been activated, the base station may transmit DL BM-based UL BPL indication to the terminal at operation 345. For example, the base station may transmit information on the resource indicator of a DL beam to be used for UL transmission to the terminal. For a detailed method of transmitting the UL BPL indication, reference is made to the operation of the first embodiment. Operation 340 and operation 345 are different in the contents of the indications. The indications of operations 340 and 345 may be included in a single message and transmitted or may be included in different messages and transmitted.

After operation 335 or operation 345, the base station may receive an UL signal, data or an RS from the terminal based on the indicated UL BPL at operation 350.

Figure 3B:
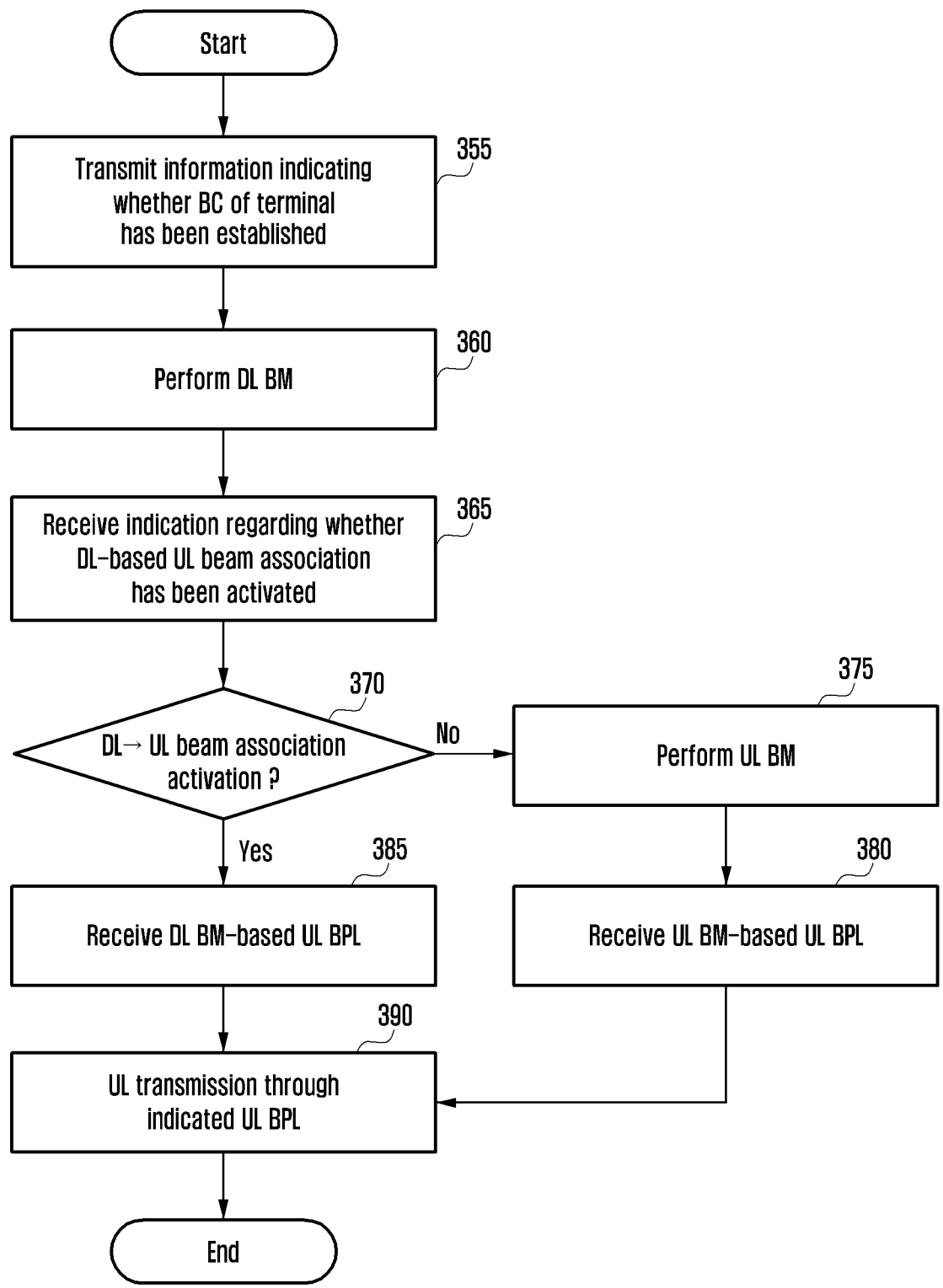
FIG. 3B is a diagram showing a procedure of a terminal for a DL-based UL beam association according to a first embodiment of the disclosure.

FIG. 3B is a diagram showing a procedure of a terminal for a DL-based UL beam association according to a first embodiment of the disclosure.

Referring to FIG. 3B, at operation 355 the terminal may transmit information indicating whether the BC of the terminal has been established to a base station. At operation 360, the terminal performs DL BM along with the base station. The terminal may perform DL BM based on the indication of the base station. The terminal may obtain at least one BPL as a result of the execution of the DL BM.

At operation 365, the terminal may receive indication regarding whether a DL-based UL beam association has been activated from the base station. The indication may indicate the deactivation of a DL-based UL beam association. For example, the indication may transmit information indicating whether a beam to be used for UL transmission is a DL CSI-RS, an SSB or an SRS. For a detailed operation, reference is made to the method of transmitting indication regarding whether a DL-based UL beam association has been activated in the first embodiment.

At operation 370, the terminal checks whether the DL-based UL beam association is activated. If the DL-based UL beam association has been deactivated, the terminal proceeds to operation 375. If the DL-based UL beam association has been activated, the terminal proceeds to operation 385.

If the DL-based UL beam association has been deactivated, the terminal may perform UL BM along with the base station at operation 375. At operation 380, the terminal receives UL BM-based UL BPL indication from the base station. For a detailed method of transmitting the UL BLP indication, reference is made to the operation of the first embodiment.

If the DL-based UL beam association has been activated, the terminal may receive DL BM-based UL BPL indication from the base station at operation 385. For example, the terminal may receive information on the resource indicator of a DL beam to be used for UL transmission from the base station. For a detailed method of transmitting the UL BPL indication, reference is made to the operation of the first embodiment. Operation 365 and operation 385 are different in the contents of the indications. The indications of operations 365 and 385 may be included in a single message and transmitted or may be included in different messages and transmitted.

After operation 380 or operation 385, the terminal may transmit an UL signal, data or an RS to the base station based on the indicated UL BPL at operation 390.

Second Embodiment: DL-UL Reciprocal-Beam Association

The second embodiment is an embodiment in which a BPL established through DL BM is applied to UL transmission and a BPL established through UL BM may also be applied to DL transmission. Assuming that a CSI-RS and an SRS are respectively used for DL BM and UL BM, a beam applied to DL transmission may include the following cases depending on whether a DL-UL reciprocal beam is associated in the second embodiment.

With DL-UL reciprocal beam association: an SRS-based DL CSI-RS/DL DMRS/PDCCH/PDSCH is possible.

Without DL-UL reciprocal beam association: a CSI-RS-based DL DMRS/PDCCH/PDSCH is possible.

Likewise, a beam applied to UL transmission may include the following cases.

With DL-UL reciprocal beam association: a CSI-RS-based UL SRS/UL DMRS/PUCCH/PUSCH is possible.

Without DL-UL reciprocal beam association: an SRS-based UL DMRS/PUCCH/PUS CH.

For the second embodiment, a base station may indicate the following two indications (i.e., indication regarding whether a DL-UL reciprocal beam association has been activated and a DL BPL indication-UL BPL indication) for a terminal.

1. Indication Regarding Whether DL-UL Reciprocal Beam Association has Been Activated.

The indication regarding whether a DL-UL reciprocal beam association has been activated may be divided into indication notifying a terminal of whether a BPL established through DL BM is used for UL transmission and indication notifying a terminal of whether a BPL established through UL BM is used for DL transmission. A terminal may configure beams used for DL transmission and UL transmission based on the indications. The corresponding indication may be expressed through a beam association between a DL RS and an UL RS or QCL between a DL RS and an UL RS in the standard rule, but operations denoted by the indication are the same. A beam association between a DL RS and an UL RS may include the following associations between RSs:

A DL CSI-RS and an UL SRS;
A DL CSI-RS and an UL DMRS;
A DL CSI-RS and an UL SRS/UL DMRS; and
A DL CSI-RS and an UL SRS/UL DMRS/UL phase tracking RS (PTRS).

Such various expression methods of denoting the association between RSs may be used, but all the denoting operations are the same in that a beam obtained through a DL CSI-RS is applied to UL transmission (e.g., an UL SRS/UL DMRS/PUCCH/PUSCH/UL PTRS).

Likewise, a beam association between an UL RS and a DL RS may include the following associations between RSs:

An UL SRS and a DL CSI-RS;
An UL SRS and a DL DMRS;
An UL SRS and a DL CSI-RS/DL DMRS; and
An UL SRS and a DL CSI-RS/DL DMRS/DL phase tracking RS (PTRS).

Indication regarding whether a DL-UL reciprocal beam association has been activated may include both semi-static and dynamic indication methods. The semi-static method is indicated through higher layer signaling, and the dynamic method may include the following indication methods:
a) DCI indication;
b) MAC CE indication; and
c) DCI+MAC CE indication.

The DCI+MAC CE indication method is a method of indicating an association with a given RS through DCI and indicating an association with a different RS through an MAC CE. In a related embodiment, the PUCCH relation between a DL CSI-RS and an UL DMRS is indicated through an MAC CE. The PUSCH relation between a DL CSI-RS and an UL DMRS may be indicated through DCI.

2. DL BPL Indication & UL BPL Indication.

The DL BPL indication is indication providing notification of a DL BPL to be used for DL transmission. The UL BPL indication is indication for providing notification of an UL BPL to be used for UL transmission. In this case, if a DL-UL reciprocal beam association has been activated, some of BPLs established through DL BM are indicated as an UL BPL. If a DL-UL reciprocal beam association has not been activated, some of BPLs established through UL BM is indicated as an UL BPL. Likewise, if an UL-DL reciprocal beam association has been activated, some of BPLs established through UL BM is indicated as a DL BPL. If an UL-DL reciprocal beam association has not been activated, some of BPLs established through DL BM is indicated as a DL BPL. When DL BPL indication and UL BPL indication are performed, if the number of activated BPLs is plural, there is a need for indication of a bitmap form. The DL BPL indication and the UL BPL indication may be indicated through higher layer signaling in the case of the semi-static method. Furthermore, the DL BPL indication and the UL BPL indication may be dynamically performed using one of the DCI, MAC CE and DCI+MAC CE methods. There are proposed some methods for the DL BPL indication and the UL BPL indication.

2.1 DL/UL BPL indication through RS resource indicator: a method of sharing a related BPL by providing notification of the resource of an RS used for DL BM or UL BM. For example, it is assumed that a CSI-RS is used for DL BM and an SRS is used for UL BM. In this case, if a DL-UL reciprocal beam association has been activated, a base station may share information about which BPL will be used with a terminal by notifying the terminal of a CSI-RS resource indicator (CRI). In this case, a method of providing notification of a given BPL by combining a CRI and a CSI-RS port may be used in addition to using only the CRI. In contrast, if a DL-UL reciprocal beam association has not been activated, a base station may share information about which BPL will be used with a terminal by notifying the terminal of an SRS resource indicator (SRI). In this case, a method of providing notification of a given BPL by combining an SRI and an SRS port may be used in addition to using only the SRI. Even in the case of an UL-DL reciprocal beam association, indication having the same format as that described above is possible. Although different RSs are used for DL BM and UL BM, BPL information may be notified using an RS resource and an RS port using the same method.

2.2 DL/UL BPL indication through BPL index indication: a method of sharing BPLs to be used for DL transmission and UL transmission by providing notification of the index of the BPL established through BM. If the case of FIG. 1 is taken as an example, the method is a method in which the number of BPLs formed between the base station and the terminal is three and the base station notifies the terminal of the index of a BPL that belongs to the BPL #1 to the BPL #3 and that is activated for DL BPL indication or UL BPL indication.

2.3 DL/UL BPL indication through beam index indication: a method of sharing BPLs to be used for DL transmission and UL transmission by providing notification of a beam index used in beam sweep in a BM process. It is assumed that in a BM process, a transmission stage performs beam sweep using 16 beams and a reception stage forms BPLs by reporting the four preferred beams of the 16 beams to the transmission stage. In this case, since the four BPLs are formed, there is a difference in that for DL BPL indication or UL BPL indication, an activated BPL of the four candidates is notified in Method 2.2 and an activated BPL of the 16 candidates is notified in Method 2.3.

Figure 4A:
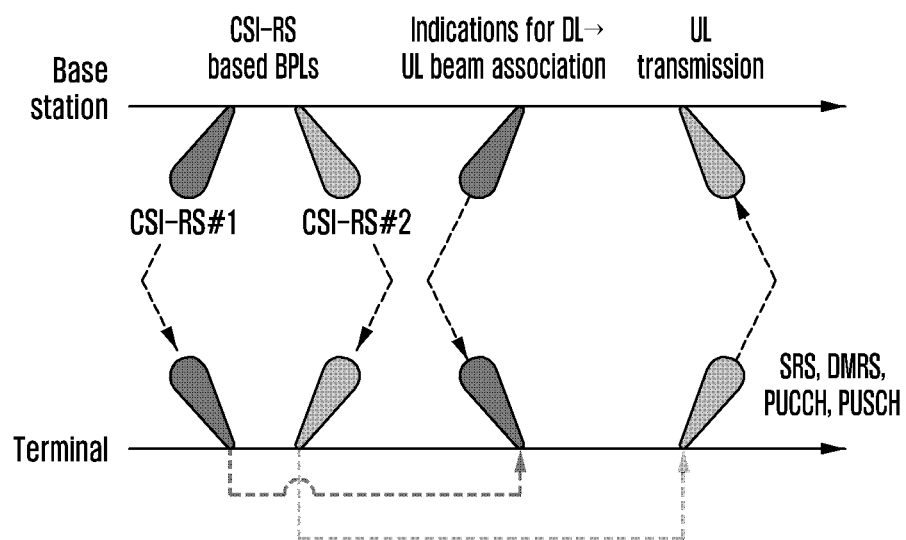
FIGS. 4A and 4B are diagrams showing a process of applying a beam used for UL transmission through indication if a DL-based UL beam association has been activated and an UL-based DL beam association has been activated according to a second embodiment of the disclosure.
Figure 4B:
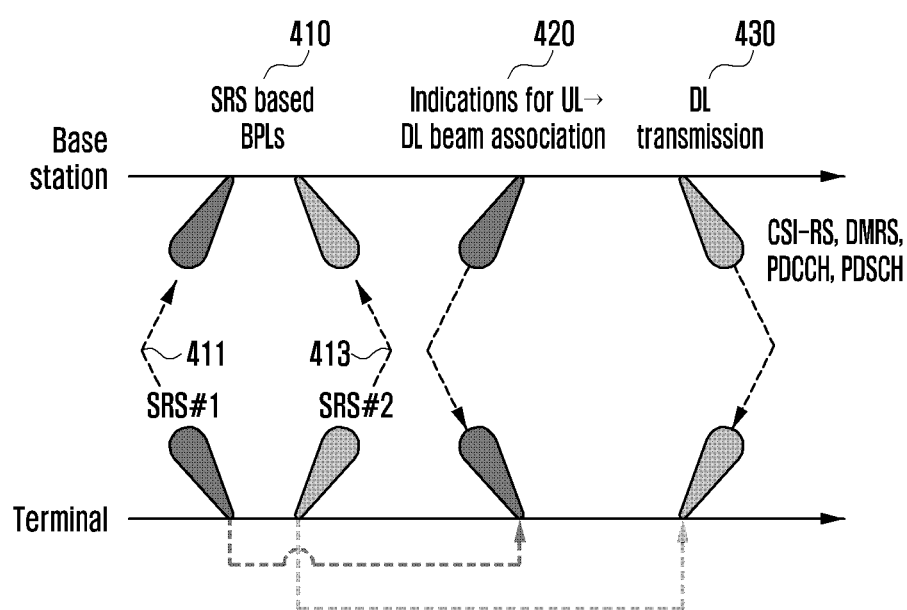

FIG. 4A is a diagram showing a process of applying a beam used for DL-based UL transmission through the indication if a DL-UL reciprocal beam association has been activated according to a second embodiment of the disclosure. FIG. 4B is a diagram showing a process of applying a beam used for UL-based DL transmission through the indication if an UL-DL reciprocal beam association has been activated according to a second embodiment of the disclosure.

A description of the operation of FIG. 4A is omitted because the operation is redundant with that of the first embodiment. Referring to FIG. 4B, operation 410 shows an example in which two BPLs have been established through SRS-based UL BM. In this case, it is assumed that an SRS #1-based BPL 411 is used for DL transmission and an SRS #2-based BPL 413 is used for UL transmission. Next, operation 420 is a process for a base station to perform indication necessary for an UL-DL reciprocal beam association with respect to a terminal. Operation 430 is a process for the terminal to perform DL transmission by applying a DL BPL based on the received indication. In this case, the DL BPL may be applied to a DL CSI-RS, a DL DMRS, a PDCCH or a PDSCH.

Figure 5A:
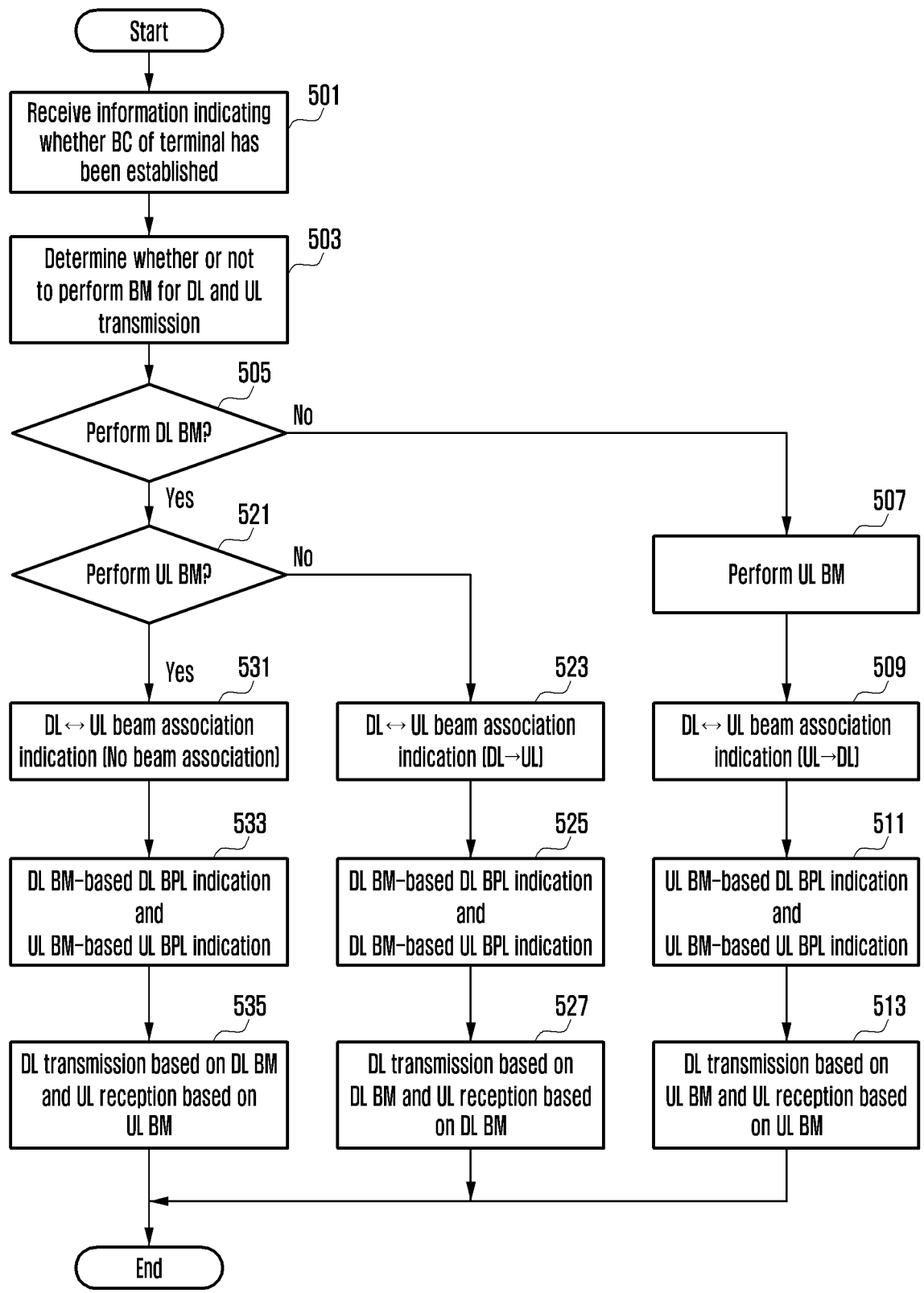
FIG. 5A is a diagram showing a procedure of a base station for a DL-UL reciprocal beam association according to a second embodiment of the disclosure.

FIG. 5A is a diagram showing a procedure of a base station for a DL-UL reciprocal beam association according to a second embodiment of the disclosure.

Referring to FIG. 5A, at operation 501 the base station may receive information indicating whether the BC of a terminal has been established. At operation 503, the base station may determine whether or not to perform BM for the DL transmission of the base station and the UL transmission of the terminal. If the base station has performed DL BM at operation 505, it proceeds to operation 521. If the base station has not performed DL BM, it proceeds to operation 507. Furthermore, if the base station has performed UL BM at operation 521, it proceeds to operation 531. If the base station has not performed UL BM at operation 521, it proceeds to operation 523. The sequence of operation 505 and operation 521 may be exchanged.

First, if the base station has not performed DL BM at operation 505, the base station may perform UL BM at operation 507. At operation 509, the base station may transmit DL-UL reciprocal beam association indication to the terminal. At operation 511, the base station may transmit UL BM-based DL BPL indication and UL BM-based UL BPL indication to the terminal. For a detailed method of transmitting the indications at operation 509 and operation 511, reference is made to the detailed method of transmitting the indication described in the second embodiment. At operation 513, the base station may transmit a DL signal, a channel, data or control information to the terminal based on the UL BM-based DL BPL indication, and may receive an UL signal, a channel, data or control information from the terminal based on the UL BM-based UL BPL indication.

If the base station has performed DL BM at operation 505, it proceeds to operation 521. If the base station has not performed UL BM at operation 521, it proceeds to operation 523. At operation 523, the base station may transmit DL-UL reciprocal beam association indication to the terminal. At operation 525, the base station may transmit DL BM-based DL BPL indication and DL BM-based UL BPL indication to the terminal. For a detailed method of transmitting the indication at operation 523 and operation 525, reference is made to the detailed method of transmitting the indication described in the second embodiment. At operation 527, the base station may transmit a DL signal, a channel, data or control information from the terminal based on the DL BM-based DL BPL indication, and may receive an UL signal, a channel, data or control information based on the DL BM-based UL BPL indication.

If the base station has performed UL BM at operation 521, it proceeds to operation 531. At operation 531, the base station may transmit DL-UL reciprocal beam association indication to the terminal. At operation 533, the base station may transmit DL BM-based DL BPL indication and UL BM-based UL BPL indication to the terminal. For a detailed method of transmitting the indication operation 531 and operation 533, reference is made to the detailed method of transmitting the indication described in the second embodiment. At operation 535, the base station may transmit a DL signal, a channel, data or control information to the terminal based on the DL BM-based DL BPL indication, and may receive an UL signal, a channel, data or control information from the terminal based on the UL BM-based UL BPL indication.

Figure 5B:
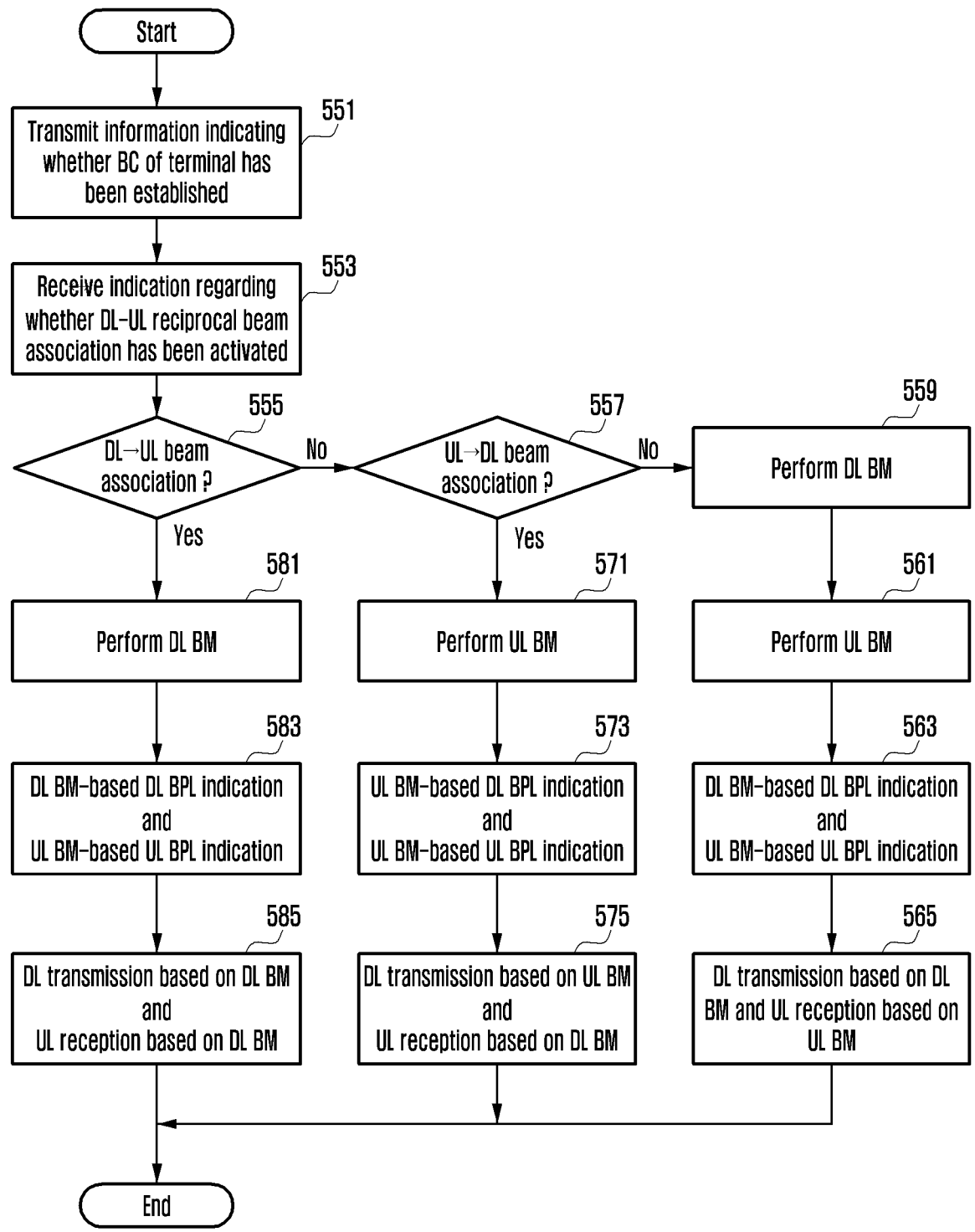
FIG. 5B is a diagram showing a procedure of a terminal for a DL-UL reciprocal beam association according to a second embodiment of the disclosure.

FIG. 5B is a diagram showing a procedure of a terminal for a DL-UL reciprocal beam association according to a second embodiment of the disclosure.

Referring to FIG. 5B, at operation 551 the terminal may transmit information indicating whether the BC of the terminal has been established to a base station. At operation 553, the terminal may receive indication regarding whether a DL-UL reciprocal beam association has been activated from the base station. At operation 555, the terminal determines whether a DL-based UL beam association is applied. If the DL-based UL beam association is applied, the terminal proceeds to operation 581. If the DL-based UL beam association is not applied, the terminal proceeds to operation 557. At operation 557, the terminal determines whether an UL-based DL beam association is applied. If the UL-based DL beam association is supported, the terminal proceeds to operation 571. If the UL-based DL beam association is not supported, the terminal proceeds to operation 559.

If the DL-UL reciprocal beam association is not supported, the terminal performs DL BM along with the base station at operation 559. At operation 561, the terminal performs UL BM along with the base station. At operation 563, the terminal receives DL BM-based DL BPL indication and UL BM-based UL BPL indication. At operation 565, the terminal may receive a DL signal, a channel, data or control information from the base station based on the DL BM-based DL BPL indication, and may transmit an UL signal, a channel, data or control information to the base station based on the UL BM-based UL BPL indication.

If the UL-based DL beam association is supported at operation 557, the terminal performs UL BM along with the base station at operation 571. At operation 573, the terminal receives UL BM-based DL BPL indication and UL BM-based UL BPL indication from the base station. At operation 575, the terminal may receive a DL signal, a channel, data or control information from the base station based on the UL BM-based DL BPL indication, and may transmit an UL signal, a channel, data or control information to the base station based on the UL BM-based UL BPL indication.

If the DL-based UL beam association is supported at operation 555, the terminal may perform DL BM along with the base station at operation 581. At operation 583, the terminal may receive DL BM-based DL BPL indication and DL BM-based UL BPL indication from the base station. At operation 585, the terminal may receive a DL signal, a channel, data or control information from the base station based on the DL BM-based DL BPL indication, and may transmit an UL signal, a channel, data or control information to the base station based on the DL BM-based UL BPL indication.

Third Embodiment: UL-Based DL Beam Association

The third embodiment is an embodiment in which a BPL established through UL BM is applied DL transmission. A representative scenario of the third embodiment includes a case where a BPL established through an UL SRS (used in UL BM) is used for a DL CSI-RS/DL DMRS/PDCCH/PDSCH. For the third embodiment, a base station may provide a terminal with the following two indications (i.e., indication for an UL-based DL beam association and a DL BPL indication).

1. Indication for UL-Based DL Beam Association.

The indication for an UL-based DL beam association is indication that notifies a terminal of whether a BPL established through UL BM is used for DL transmission. The terminal may configure a beam used for DL transmission based on the indication. The corresponding indication may be expressed through a beam association between an UL RS and a DL RS in the standard rule, but operations indicated by the indication are the same. In the method of expressing a beam association between an UL RS and a DL RS, the UL RS indicates an RS used for UL BM and the DL RS indicates an RS used for DL transmission. For example, if an SRS is used for UL BM, the following associations between RSs may be used:

An UL SRS and a DL CSI-RS;
An UL SRS and a DL DMRS;
An UL SRS and a DL CSI-RS/DL DMRS; and
An UL SRS and a DL CSI-RS/DL DMRS/DL phase tracking RS (PTRS).

Such various expression methods of denoting an association between RSs may be used, but all the denoting operations are the same in that a beam obtained through an UL SRS is applied to DL transmission (e.g., a DL CSI-RS/DL DMRS/PDCCH/PDSCH/DL PTRS). Indication regarding whether an UL-based DL beam association has been activated includes both semi-static and dynamic indication methods. The semi-static method is indicated through higher layer signaling, and the dynamic method may include the following indication methods:

a) DCI indication;
b) MAC CE indication; and
c) DCI+MAC CE indication.

The DCI+MAC CE indication method is a method of indicating an association with a given RS through DCI and indicating an association with a different RS through an MAC CE. In a related embodiment, the UL SRS→DL DMRS of a PDCCH may be indicated through an MAC CE, and the UL SRS→DL DMRS of a PDSCH may be indicated through DCI.

2. DL BPL Indication.

The DL BPL indication is indication for providing notification of a DL BPL to be used for DL transmission. In this case, if an UL-based DL beam association has been activated, some of BPLs established through UL BM is indicated. If the UL-based DL beam association has not been activated, some of BPLs established through DL BM is indicated. Accordingly, the DL BPL indication may be indicated regardless of whether an UL-based DL beam association has been activated. When the DL BPL indication is performed, if the number of activated BPLs is plural, there is a need for indication of a bitmap form. In the semi-static method, the DL BPL indication may be performed through higher layer signaling. Furthermore, the DL BPL indication may be dynamically performed using one of the DCI, MAC CE and DCI+MAC CE methods. The following proposes some methods for the DL BPL indication.

2.1 DL BPL indication through RS resource indicator: a method of sharing a related BPL by providing notification of the resource of an RS used for DL BM or UL BM. For example, it is assumed that a CSI-RS is used for DL BM and an SRS is used for UL BM. In this case, if an UL-based DL beam association has been activated, a base station may share information about which BPL will be used with a terminal by notifying the terminal of an SRS resource indicator (SRI). In this case, a method of providing notification of a given BPL by combining an SRI and an SRS port may be used in addition to using only the SRI. In contrast, if the UL→beam association has not been activated, the base station may share information about which BPL will be used with the terminal by notifying the terminal of a CSI-RS resource indicator (CRI). In this case, a method of providing notification of a given BPL by combining a CRI and a CSI-RS port may be used in addition to using only the CRI. Although different RSs are used for DL BM and UL BM, BPL information may be notified using an RS resource and an RS port using the same method.

2.2 DL BPL indication through BPL index indication: a method of sharing a BPL to be used for DL transmission by providing notification of the index of the BPL established through BM. If the case of FIG. 1 is taken as an example, the method is a method in which the number of BPLs formed between the base station and the terminal is three and the base station notifies the terminal of the index of a BPL that belongs to the BPL #1 to the BPL #3 and that is activated for DL BPL indication.

2.3 DL BPL indication through beam index indication: a method of sharing a BPL to be use for DL transmission by providing notification of a beam index used in beam sweep during a BM process. It is assumed that in an UL BM process, a terminal performs beam sweep using 16 beams and a base station forms BPLs by notifying the terminal of the indices of the four preferred beams of the 16 beams. In this case, since the four BPLs are formed, there is a difference in that for DL BPL indication, an activated BPL of the four candidates is notified in Method 2.2 and an activated BPL of the 16 candidates is notified in Method 2.3.

Figure 6:
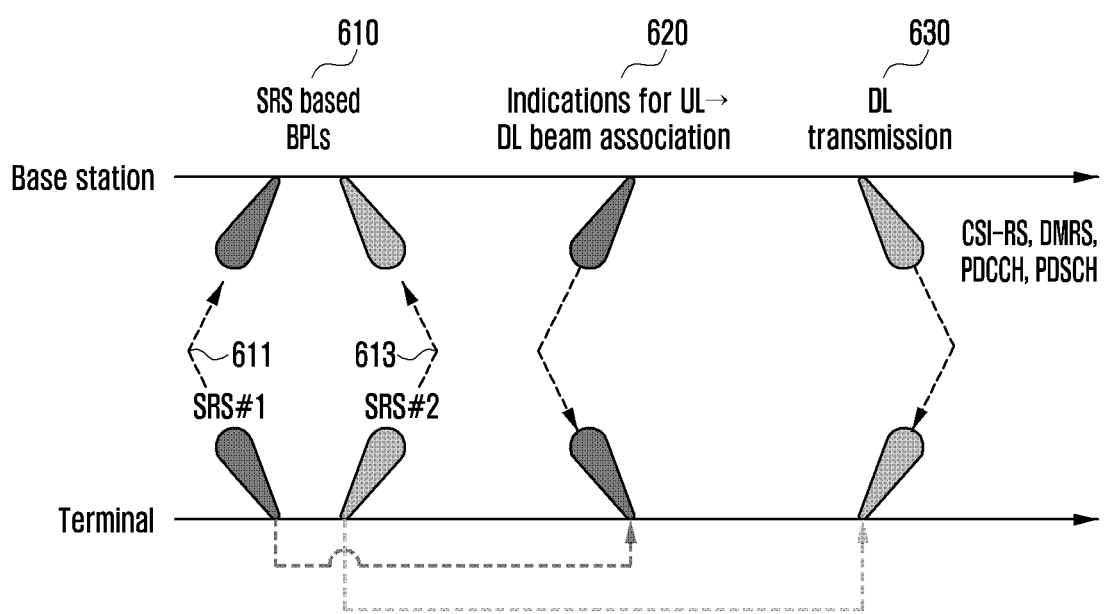
FIG. 6 is a diagram showing a process of applying a beam used for DL transmission through indication if an UL-based DL beam association has been activated according to an embodiment of the disclosure.

FIG. 6 is a diagram showing a process of applying a beam used for DL transmission through indication if an UL-based DL beam association has been activated according to a third embodiment of the disclosure.

Referring to FIG. 6, operation 610 shows an example in which two BPLs have been established through SRS-based UL BM. In this case, it is assumed that an SRS #1-based BPL 611 has been determined to be used for UL transmission and an SRS #2-based BPL 613 has been determined to be used for DL transmission. Next, operation 620 is a process for a base station to perform indication necessary for an UL-based DL beam association to a terminal. The corresponding indication includes the aforementioned indication regarding whether an UL-based DL beam association has been activated and the DL BPL indication, and is transmitted using a BPL of a previous version selected for DL transmission in operation 630. In FIG. 6, a right operation indicates a process for the terminal to update a DL BPL based on received indication and to perform DL reception. In this case, the DL BPL may be applied to a DL CSI-RS, a DL DMRS, a PDCCH or a PDSCH.

Figure 7A:
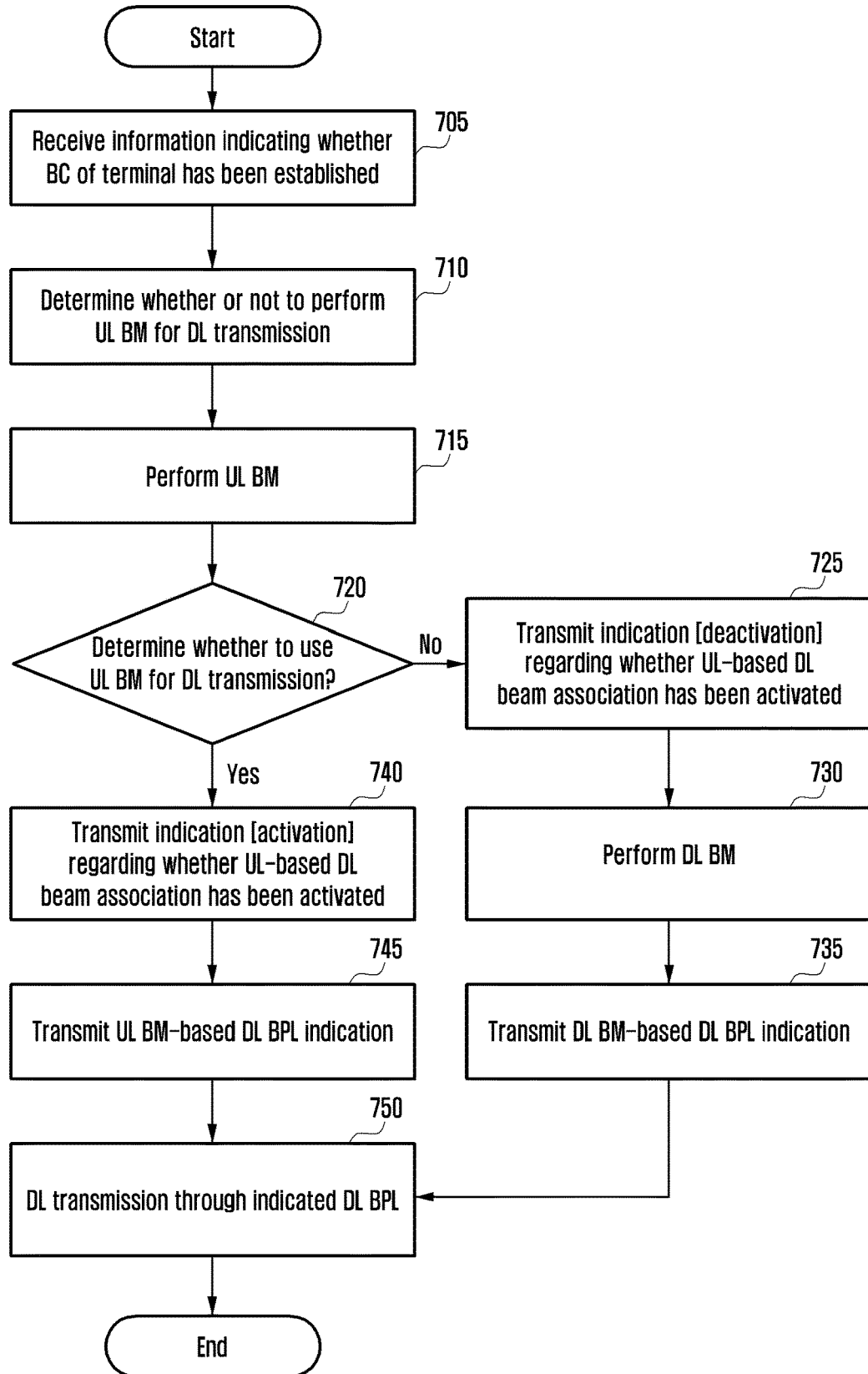
FIG. 7A is a diagram showing a procedure of a base station for an UL-based beam association according to a third embodiment of the disclosure.

FIG. 7A is a diagram showing a procedure of a base station for an UL-based beam association according to a third embodiment of the disclosure.

Referring to FIG. 7A, at operation 705 a base station may receive information indicating whether the BC of a terminal has been established. At operation 710, the base station determines whether or not to perform UL BM for DL transmission. At operation 715, the base station performs BM on the terminal. The base station may perform UL BM along with the terminal. The base station may obtain at least one BPL as a result of the execution of the UL BM.

At operation 720, the base station may determine whether to use UL BM for DL transmission. If the UL BM is not used, the base station may proceed to operation 725. If the UL BM is used, the base station may proceed to operation 740.

At operation 725, the base station may transmit indication regarding whether an UL-based DL beam association has been activated to the terminal. The indication may indicate the deactivation of the UL-based DL beam association. For a detailed operation, reference is made to the method of transmitting indication regarding whether an UL-based DL beam association has been activated, which has been described in the third embodiment. Operation may be omitted. If the DL-based UL beam association has been deactivated, the base station may perform DL BM along with the terminal at operation 730. At operation 735, the base station may transmit DL BM-based DL BPL indication to the terminal. For a detailed method of transmitting the DL BLP indication, reference is made to the operation of the third embodiment.

At operation 740, the base station may transmit indication regarding whether an UL-based DL beam association has been activated to the terminal. The indication may indicate the activation of the UL-based DL beam association. For a detailed operation, reference is made to the method of transmitting indication regarding whether an UL-based DL beam association has been activated, which has been described in the third embodiment. If the UL-based DL beam association has been activated, the base station may transmit an UL BM-based DL BPL indication to the terminal at operation 745. For a detailed method of transmitting the DL BPL indication, reference is made to the operation of the third embodiment. Operation 740 and operation 745 are different in the contents of the indications. The indications of operations 740 and 745 may be included in a single message and transmitted or may be included in different messages and transmitted.

After operation 735 or operation 745, the base station may transmit a DL signal, data, an RS or a channel to the terminal based on the indicated DL BPL at operation 750.

Figure 7B:
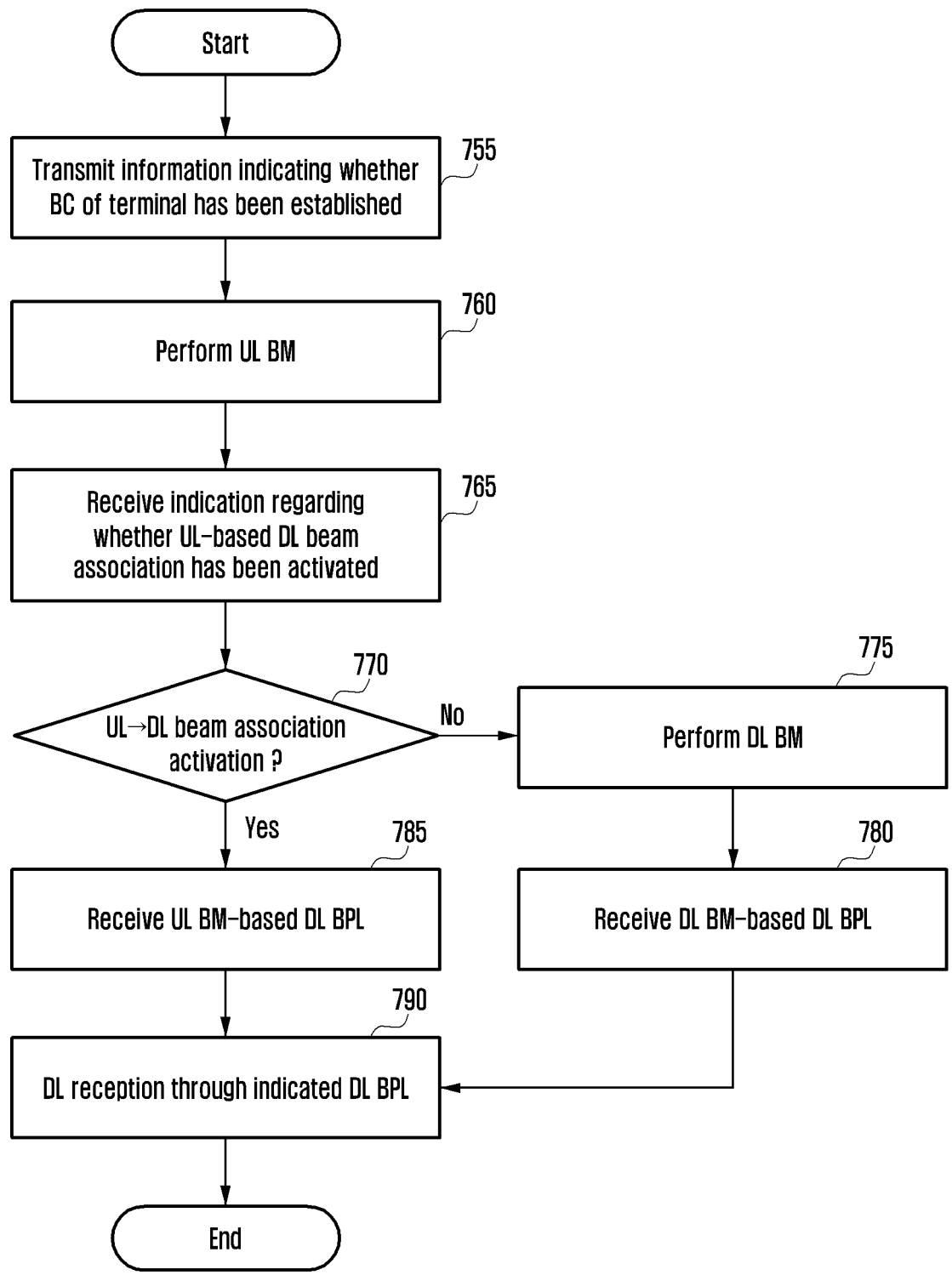
FIG. 7B is a diagram showing a procedure of a terminal for an UL-based beam association according to a third embodiment of the disclosure.

FIG. 7B is a diagram showing a procedure of a terminal for an UL-based beam association according to a third embodiment of the disclosure. At operation 755, the terminal may transmit information indicating whether the BC of the terminal has been established to a base station. At operation 760, the terminal performs UL BM along with the base station. The terminal may perform the UL BM based on the indication of the base station. The base station may obtain at least one BPL as a result of the execution of the UL BM.

Referring to FIG. 7B, at operation 765 the terminal may receive indication regarding whether an UL-based DL beam association has been activated from the base station. The indication may include the deactivation of the UL-based DL beam association. For a detailed operation, reference is made to the method of transmitting indication regarding whether an UL-based DL beam association has been activated, which has been described in the third embodiment.

At operation 770, the terminal checks whether the UL-based DL beam association has been activated. If the UL-based DL beam association has been deactivated, the terminal proceeds to operation 775. If the UL-based DL beam association has been activated, the terminal proceeds to operation 785.

If the DL-based UL beam association has been deactivated, the terminal may perform DL BM along with the base station at operation 775. At operation 780, the terminal receives DL BM-based DL BPL indication from the base station. For a detailed method of transmitting the DL BLP indication, reference is made to the operation of the third embodiment.

If the UL-based DL beam association has been activated, the terminal may receive UL BM-based DL BPL indication from the base station at operation 785. For a detailed method of transmitting the DL BPL indication, reference is made to the operation of the third embodiment. Operation 765 and operation 785 are different in the contents of the indications. The indications of operations 765 and 785 may be included in a single message and transmitted or may be included in different messages and transmitted.

After operation 780 or operation 785, the terminal may receive a DL signal, data or an RS from the base station based on the indicated DL BPL at operation 790.

Figure 8:
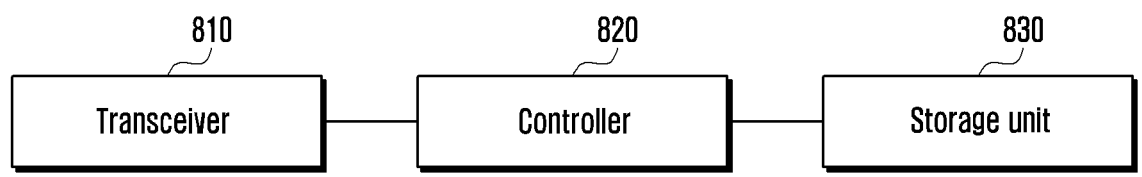
FIG. 8 is a diagram showing the configuration of a terminal according to an embodiment of the disclosure.

FIG. 8 is a diagram showing the configuration of a terminal according to an embodiment of the disclosure.

Referring to FIG. 8, the terminal may include a transceiver 810, a controller 820 and a storage unit 830. In the disclosure, the controller may be defined as a circuit or an application-specific integrated circuit or at least one processor.

The transceiver 810 may transmit/receive a signal to/from a different network entity. The transceiver 810 may receive system information from a base station, for example, and may receive a synchronization signal or a reference signal.

The controller 820 may control an overall operation of the terminal according to the embodiments proposed by the disclosure. For example, the controller 820 may control the signal flows between the blocks so that the operations according to the flowcharts are performed. Specifically, the controller 820 may control the operations proposed by the disclosure for a beam association between the DL/UL according to an embodiment of the disclosure.

Furthermore, the controller 820 may control to receive first information indicating the type of resource related to UL transmission and second information indicating the resource of the type of resource from a base station, to select a beam for UL transmission based on the first information and the second information, and to transmit an UL signal based on the selected beam to the base station. The first information may indicate at least one of a CSI-RS, a SSB and a SRS. The second information may include at least one of CSI-RS resource identity information, SSB identity information and SRS resource identity information. The first information and the second information may be included in a radio resource control (RRC) message or a medium access control-control element (MAC-CE). The second information may be indicated through an MAC CE among a plurality of information, indicated through an RRC message, indicating a plurality of resources.

The storage unit 830 may store at least one of information transmitted/received through the transceiver 810 and information generated by the controller 820.

Figure 9:
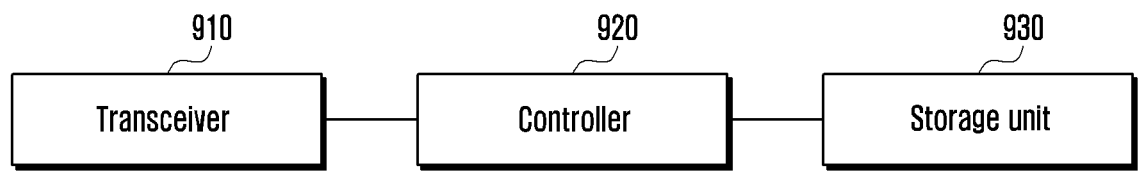
FIG. 9 is a diagram showing the configuration of a base station according to an embodiment of the disclosure.

FIG. 9 is a diagram showing the configuration of a base station according to an embodiment of the disclosure.

Referring to FIG. 9, the base station may include a transceiver 910, a controller 920 and a storage unit 930. In the disclosure, the controller may be defined as a circuit or an application-specific integrated circuit or at least one processor.

The transceiver 910 may transmit/receive a signal to/from a different network entity. The transceiver 910 may transmit system information to a terminal, for example, and may transmit a synchronization signal or a reference signal.

The controller 920 may control an overall operation of the base station according to the embodiments proposed by the disclosure. For example, the controller 920 may control the signal flows between the blocks so that the operations according to the flowcharts are performed. Specifically, the controller 920 may control the operations proposed by the disclosure for a beam association between the DL/UL according to an embodiment of the disclosure.

Furthermore, the controller 920 may control to transmit first information indicating the type of resource related to UL transmission and second information indicating the resource of the type of resource to a terminal, to select a beam for UL reception based on the first information and the second information, and to receive an UL signal based on the selected beam from the terminal. The first information may indicate at least one of a CSI-RS, a SSB and a SRS. The second information may include at least one of CSI-RS resource identity information, SSB identity information and SRS resource identity information. The first information and the second information may be included in a radio resource control (RRC) message or a medium access control-control element (MAC-CE). The second information may be indicated through an MAC CE among a plurality of information, indicated through an RRC message, indicating a plurality of resources.

The storage unit 930 may store at least one of information transmitted/received through the transceiver 910 and information generated by the controller 920.

In accordance with an embodiment of the disclosure, efficient BM and transmission using a beam can be performed by connecting a beam obtained through BM and a beam to be used for DL/UL transmission according to the DL/UL beam association method.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:
1. A method for a terminal, the method comprising:
receiving a radio resource control (RRC) message including a plurality of identity information related to uplink (UL) transmission, the plurality of identity information including an indication indicating a type of a reference signal related to the UL transmission and an index of the reference signal;

receiving, from a base station, a medium access control-control element (MAC-CE) including information associated with a physical uplink control channel (PUCCH) and the reference signal;

selecting a beam for the UL transmission based on the indication; and transmitting an UL signal based on the selected beam, wherein one identity information among the plurality of identity information is indicated by the MAC CE, and wherein the UL signal corresponds to control information transmitted on the PUCCH.

2. The method of claim 1, wherein the type indicates at least one type of: a channel state information-reference signal (CRI-RS), a synchronization signal block (SSB), or a sounding reference signal (SRS).

3. The method of claim 1, wherein the index comprises at least one of: a channel state information-reference signal (CSI-RS) resource identity information, synchronization signal block (SSB) identity information, or sounding reference signal (SRS) resource identity information.

4. A terminal comprising:
a transceiver; and
at least one processor configured to:
receive, from a base station via the transceiver, a radio resource control (RRC) message including a plurality of identity information related to uplink (UL) transmission, the plurality of identity information including an indication indicating a type of a reference signal related to the UL transmission and an index of the reference signal,
receive, from the base station via the transceiver, a medium access control-control element (MAC-CE) including information associated with a physical uplink control channel (PUCCH) and the reference signal,
select a beam for the UL transmission based on the indication, and
transmit, via the transceiver, an UL signal based on the selected beam,
wherein one identity information among the plurality of identity information is indicated by the MAC CE, and
wherein the UL signal correspond to control information transmitted on the PUCCH.

5. The terminal of claim 4, wherein the type indicates at least one type of: a channel state information-reference signal (CRI-RS), a synchronization signal block (SSB), or a sounding reference signal (SRS).

6. The terminal of claim 4, wherein the index comprises at least one of: a channel state information-reference signal (CSI-RS) resource identity information, synchronization signal block (SSB) identity information, or sounding reference signal (SRS) resource identity information.

7. A method for a base station, the method comprising:
transmitting, to a terminal, a radio resource control (RRC) message including a plurality of identity information related to uplink (UL) transmission, the plurality of identity information including an indication indicating a type of reference signal related to the UL transmission and an index of the reference signal;

transmitting, to the terminal, a medium access control-control element (MAC-CE) including information associated with a physical uplink control channel (PUCCH) and the reference signal;

selecting a beam for UL reception based on the indication; and receiving an UL signal from the terminal based on the selected beam, wherein one identity information among the plurality of identity information is indicated by the MAC CE, and wherein the UL signal corresponds to control information transmitted on the PUCCH.

8. The method of claim 7, wherein the type indicates at least one type of: a channel state information-reference signal (CRI-RS), a synchronization signal block (SSB), or a sounding reference signal (SRS).

9. The method of claim 7, wherein the index comprises at least one of: a channel state information-reference signal (CSI-RS) resource identity information, synchronization signal block (SSB) identity information, or sounding reference signal (SRS) resource identity information.

10. A base station, comprising:
a transceiver; and
at least one processor configured to:
transmit, to a terminal via the transceiver, a radio resource control (RRC) message including a plurality of identity information related to uplink (UL) transmission, the plurality of identity information including an indication indicating a type of reference signal related to the UL transmission and an index of the reference signal,
transmit, to the terminal via the transceiver, a medium access control-control element (MAC-CE) including information associated with a physical uplink control channel (PUCCH) and the reference signal,
select a beam for UL reception based on the indication, and
receive, via the transceiver, an UL signal from the terminal based on the selected beam,
wherein one identity information among the plurality of identity information is indicated by the MAC CE, and
wherein the UL signal correspond to control information transmitted on the PUCCH.

11. The base station of claim 10, wherein the type indicates at least one type of: a channel state information-reference signal (CRI-RS), a synchronization signal block (SSB), or a sounding reference signal (SRS).

12. The base station of claim 10, wherein the index comprises at least one of: channel state information-reference signal (CSI-RS) resource identity information, synchronization signal block (SSB) identity information, or sounding reference signal (SRS) resource identity information.

* * * * *